US005849340A

United States Patent [19]

Hermansson et al.

[11] Patent Number: 5,849,340

[45] Date of Patent: Dec. 15, 1998

[54] DEVICE FOR PRODUCING EXTRUDED BODIES OF A PLASTIC MATERIAL

[75] Inventors: Leif Hermansson, Gothenburg; Nemo Ivarson, Enskede, both of Sweden

[73] Assignee: Hermex AB, Kallered, Sweden

[21] Appl. No.: 875,904

[22] PCT Filed: Feb. 5, 1996

[86] PCT No.: PCT/SE96/00135

§ 371 Date: Aug. 7, 1997

§ 102(e) Date: Aug. 7, 1997

[87] PCT Pub. No.: WO96/24484

PCT Pub. Date: Aug. 15, 1996

[30] Foreign Application Priority Data

Feb. 7, 1995 [SE] Sweden .................................. 9500433

[51] Int. Cl.[6] ...................................................... B29C 47/10

[52] U.S. Cl. ....................... 425/331; 264/169; 264/176.1; 425/204; 425/365; 425/382 R; 425/DIG. 230

[58] Field of Search .................................... 425/200, 204, 425/207, 308, 311, 313, 331, 365, 382 R, DIG. 230; 264/140, 143, 169, 176.1

[56] References Cited

U.S. PATENT DOCUMENTS

| | | | |
|---|---|---|---|
| 2,160,302 | 5/1939 | Billows | 425/DIG. 230 |
| 3,166,026 | 1/1965 | Crane | 425/331 |
| 3,511,190 | 5/1970 | Kunz | 425/DIG. 230 |
| 4,770,625 | 9/1988 | Appelgren et al. | 425/DIG. 230 |
| 5,009,586 | 4/1991 | Pallmann | 425/311 |
| 5,242,292 | 9/1993 | Wenger | 425/DIG. 230 |

FOREIGN PATENT DOCUMENTS

| | | |
|---|---|---|
| 849237 | 11/1939 | France . |
| 1066328 | 6/1954 | France . |
| 807 187 | 4/1951 | Germany . |
| 766 894 | 10/1980 | U.S.S.R. . |
| WO 85/04367 | 10/1985 | WIPO . |

*Primary Examiner*—Patrick Ryan
*Assistant Examiner*—Joseph Leyson
*Attorney, Agent, or Firm*—Young & Thompson

[57] ABSTRACT

A device for the manufacture of extruded bodies from a plastic material or a damp pulp, comprising, arranged at an outlet end of a container for the material or the pulp, an output device (18) with a number of output wings (19) driven by a rotatably driven shaft and at an axial distance from the output device a rotatably driven extrusion device (20) with a number of extrusion wings, of which the outer ends during rotation of the extrusion device sweep closely around the inside of a surrounding cylindrical and perforated wall in order to press out to the space surrounding the wall the fed-out material through perforations in the wall. A stationary guide rail arrangement (16) is provided between the output device (18) and the extrusion device (20) and the output device and extrusion device are driven in the same direction of rotation. The output wings (19) have inclined surfaces (30) which, seen in the direction of rotation, form an acute angle ($\alpha$) with a plane lying perpendicular to the rotatably driven shaft between the output device (18) and the guide rail arrangement (16), and the guide rail arrangement has guide rails (17) with surfaces which form an opposing acute angle ($\beta$) with that plane. The rear edge of the surface of a said guide rail (17) projected against a plane perpendicular to the axis of rotation and the front edge of the corresponding surface of the next following guide rail (17) lie close to each other.

8 Claims, 2 Drawing Sheets

DEVICE FOR PRODUCING EXTRUDED BODIES OF A PLASTIC MATERIAL

FIELD OF THE INVENTION

The present invention relates to a device for the manufacture of extruded bodies from a plastic material or a damp pulp, comprising at the outlet end of a container for the material or the pulp an output device with a number of output wings driven by a rotatably driven shaft and at an axial distance from the output device a rotatably driven extrusion device with a number of extrusion wings, of which the outer ends during the rotation of the press device sweep closely up inside a surrounding annular, perforated wall in order to press out the outputted material through perforations in the wall to the space surrounding the wall.

BACKGROUND OF THE INVENTION

An extrusion device of this type is known for example from EP-A-0 163 619 and has been developed in order to avoid the disadvantages which are associated with the more usual type of extrusion devices, which works according to the same principle as a meat grinder where the material with the help of one or more screws is fed to and pressed out from a chopper disc. This way of working and the necessary high pressure entail several disadvantages which amongst others result in an unhomogenous product as well as deformation of the chopper disc after just a short period of use since the pressure acts on the total surface of the chopper disc.

A device of the type mentioned in the introduction works according to a low pressure principle. The spatula-like rotating extrusion wings press the material through the perforations in the annular wall which can be conical or cylindrical. The pressure forces on the perforated wall are localised along the lines where the wines contact the wall, which means that the forces on the perforated wall are only a fraction of those on the firstmentioned chopper disc.

An essential characteristic of the extruder known from EP-A-0 163 619 is that the output device and the press device rotate in opposite directions and for this purpose each device has its own drive motor.

OBJECT OF THE INVENTION

The object of the present invention is generally to produce an extrusion device which works according to the low pressure principle and has lower manufacturing and operating costs than corresponding prior art extrusion devices as well as its principle of construction resulting in a large number of variables for optimising of the capacity and the quality of the extrusion.

SUMMARY OF THE INVENTION

This is achieved according to the invention by a stationary guide rail arrangement being placed between the output device and the press device, and by the output device and press device being driven in the same direction of rotation.

Through having the output and press device rotating in the same direction it is possible to design their geometries so that they can also rotate with the same speed and in this way be fixed on a common shaft. One of the advantages with this compared with the prior art design is that just one drive motor suffices.

BRIEF DESCRIPTION OF THE DRAWINGS

The invention is described more closely with reference to the appended drawings showing an embodiment, where FIG.

1 shows a longitudinal cross-section through an embodiment of a device according to the invention.

DETAILED DESCRIPTION OF THE INVENTION

Figure 1:
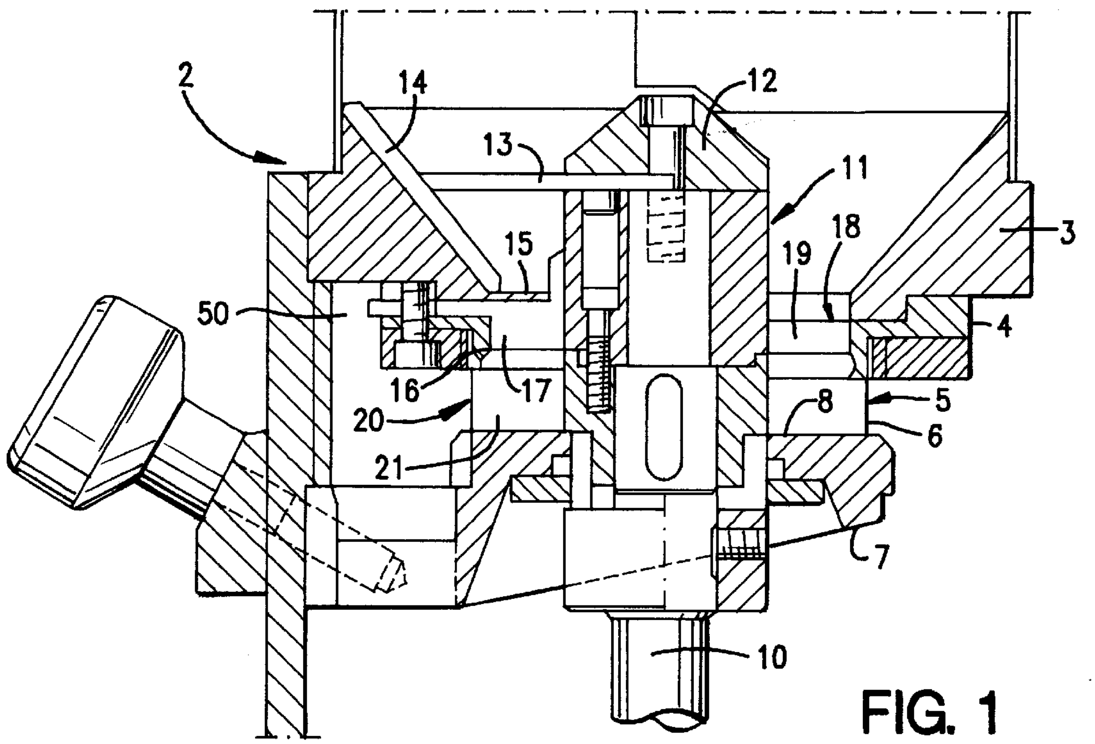
Figure 2:
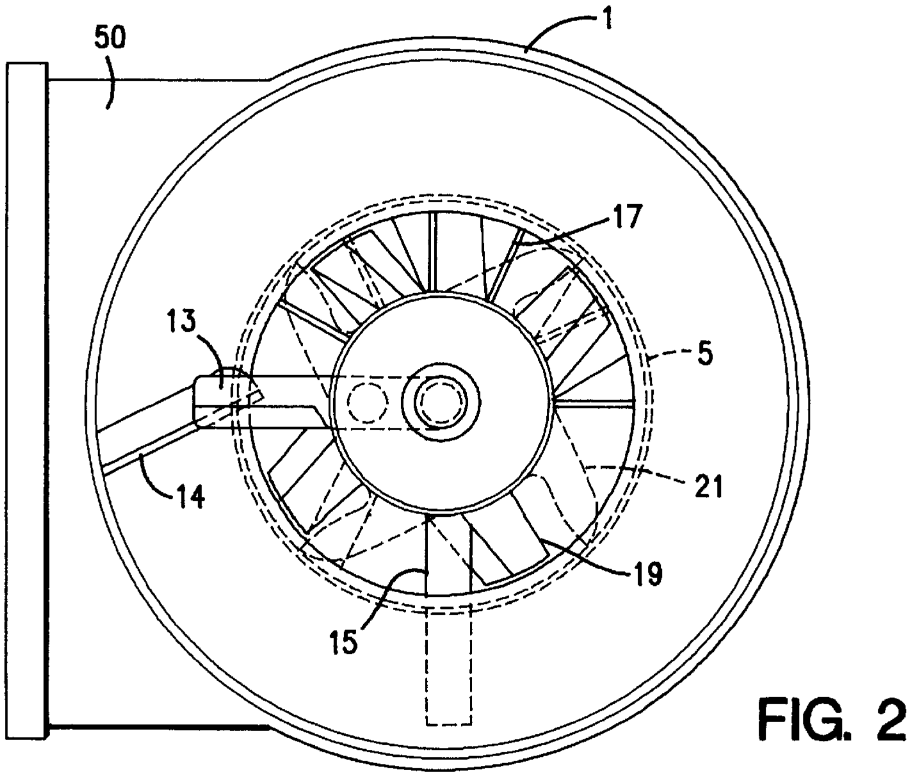
FIG. 2 is a view from above of the device in FIG. 1, FIG. 3 a sectioned extension of a part of the device in FIG. 1, FIG. 4 a plan view of the output device in FIG. 1 and FIG. 5 a plan view of the extrusion device in the device shown in FIG. 1.

In FIG. 1 the lower part of a cylindrical container for the material which is to be extruded has the reference sign 1. By the bottom edge of the container 1 an extruder with the reference sign 2 is fixed which comprises a casing comprising an internally conical upper part 3, a cylindrical intermediate part 4, a cylinder 5 with a perforated cylindrical wall 6 and a circular bottom disc 7 with a flat internal bottom surface 8. which are fixedly joined with each other and delimit a space into which material from the container can be fed down.

Figure 4:
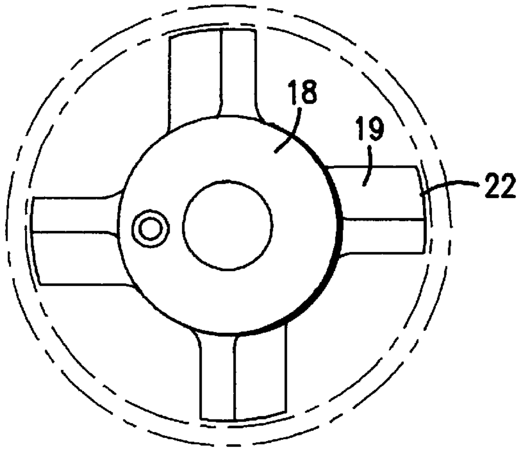
Figure 5:
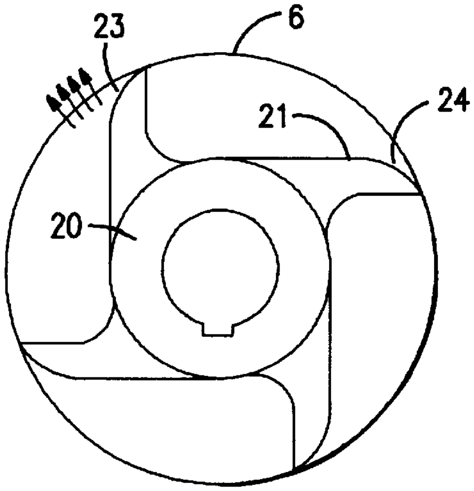

A shaft 10 driven by an electrical motor (not shown) has a rotor with the general reference 11 fixed on it. The rotor 11 is mounted in bearings in the bottom disc 7 and has a conical part 12 from the bottom edge of which an arm 13 extends which at its outermost end carries an arch breaker and scraper wing 14 which lies close up to the end of the wall of the conical upper part 3. Immediately below the wing 14 is a scraper 15 which is screwed fast to the intermediate casing part 4 of which the lower part forms a guide rail device 16 with guide rails 17. In the space between the scraper 15 and the guide rail arrangement 16 there is fixed by the rotor an output device 18 having four output wings 19 which fill up almost all of the cross-section of the space. In a chamber between the guide rail arrangement 16 and the bottom disc 7 which is surrounded by the perforated cylindrical wall 6 is an extrusion device 20 with four extrusion wings 21 attached to the rotor, which fill up almost all of the cross-section of the chamber. The extrusion wings 21 have a surface which faces away from the guide rail arrangement 16 and lies closely up against the surface 8 oriented perpendicular to the axis of rotation on the bottom plate 7 on which the perforated wall 6 is fixed. As can be seen especially in FIGS. 4 and 5 the outer ends of the output wings 19 and extrusion wings 21 consequently lie close to the respective surrounding cylindrical walls. The end surfaces 22 of the output wings 19 facing towards the wall have the same curvature as the cylinder walls, while the end surfaces 23 of the extrusion wings facing towards the perforated wall 6 are curved and bent so that a nearly triangular gap 24 is formed between the wall 6 and the extrusion wing surface 23.

Figure 3:
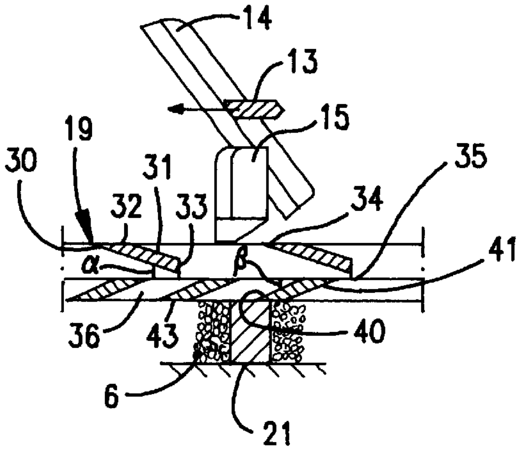

As is evident from FIG. 3 the output wings 19 have a parallelepipedic cross-section. The two parallel sides 30, 31 form an acute angle $\alpha$ with a plane perpendicular to the axis of rotation. One upper side 32 is parallel with and a rear side 33 perpendicular to said plane. In this way an upper edge 34 which cuts through the material and a rear edge 35 which scrapes off material from the upper side of the guide rails are formed. The upper and rear sides 32, 33 define surrounding surfaces that together with the inclined surfaces 30, 31 form the front and rear sharp edges 34, 35 which during rotation sweep closely up against the opposing surfaces on the scraper 15 and the guide rails 17, respectively. Material is fed during rotation of the rotor through the gaps 36 between the guide rails 17 and the wall 6 of the surrounding chamber by the surface 30 joined to the edge 35.

The guide rails 17 have parallel sides 40, 41 which are inclined at an angle $\beta$ against said plane, as well as upper and lower sides 42, 43 which are parallel with the plane in question. Angle β is the opposite of angle α. In the embodiment shown angles α and β are equally large. The guide rails 17 are so dimensioned and positioned that the back edge of the surfaces of the guide rails 17 projected against said plane and the front edges of the corresponding surfaces of the next following guide rail lie close against each other. Through the described arrangement the guide rails 17 prevent material from being pressed back through the gaps 36 between the guide rails when the material is pressed by the extrusion wings 21 against the perforated wall. The material which is pressed out through the perforations end up as strings in an outlet chamber 50 and is transferred from there to a collection device (not shown). Material which does not fall downwards from the container 1 to the cylindrical casing part 4 through its own weight is scraped off by the arch breaker wing 14,the arm 13 of which prevents arches building in the material.

Through varying the speed of rotation of the rotor 11, the number of output wings 19 and extrusion wings 21, the size of angles α and β and the thickness of the perforated wall the extrusion device according to the invention can be adapted to the material which is to be worked so that the capacity and the quality of the extrudent from the device will be optimal.

We claim:

1. In a device for the manufacture of extruded bodies from a plastic material or a damp pulp, comprising, arranged at an outlet end of a container for the material or the pulp, an output device (18) with a number of output wings (19) driven by a rotatably driven shaft and at an axial distance from the output device a rotatably driven extrusion device (20) with a number of extrusion wings, of which the outer ends during rotation of the extrusion device sweep closely around the inside of a surrounding cylindrical and perforated wall in order to press out to the space surrounding the wall the fed-out material through perforations in the wall, wherein a stationary guide rail arrangement (16) is provided between the output device (18) and the extrusion device (20) and the output device and extrusion device are driven in the same direction of rotation; the improvement wherein the output wings (19) have inclined surfaces (30) which, seen in the direction of rotation, form an acute angle (α) with a plane lying perpendicular to the rotatably driven shaft between the output device (18) and the guide rail arrangement (16), and the guide rail arrangement has guide rails (17) with surfaces which form an opposing acute angle (β) with said plane.

2. Device according to claim 1, wherein the output device (18) and the extrusion device (20) are supported on a common shaft (10) comprising said rotatably driven shaft.

3. Device according to claim 1, wherein an arch breaker and scraper wing (14) are supported by the shaft (10) on the side of the output device (18) which is opposite the extrusion device (20).

4. Device according to claim 1, wherein the rear edge of the surface of one of said guide rails (17) projected against a plane perpendicular to the axis of rotation of the shaft and the front edge of the corresponding surface of the next following guide rail (17) lie close to each other.

5. Device according to claim 1, wherein the respective extrusion wings (21) have an end part with a slightly rounded side surface (24) which finishes in an edge closely up against the perforated wall and together with the perforated wall forms a triangular gap (24), seen in a plane perpendicular to the axis of rotation of the shaft.

6. Device according to claim 1, wherein the respective extrusion wings (21) have a surface which is facing away from the guide rail arrangement (16) and lies closely up against a surface (8) orientated perpendicular to the axis of rotation of the shaft on a bottom plate (7) on which the perforated wall (6) is fixed.

7. Device according to claim 3, wherein at least one stationary scraper (15) is arranged between the arch breaker and scraper wing (14) and the output device (16).

8. Device according to claim 7, wherein the output wings have a parallelepipedic cross-section and their inclined surfaces (30,31) together with surrounding surfaces (32,33) thereof form front and rear sharp edges (34,35), seen in the direction of rotation, which during rotation sweep closely up against the opposing surfaces on the scraper (15) and the guide rails (17), respectively.

* * * * *